United States Patent Office 3,832,336
Patented Aug. 27, 1974

3,832,336
CURING AND POLYMERIZING PROCESSES EMPLOYING β-SUBSTITUTED DIPEROXYKETALS
Jurgen Groepper, Gunburg, Germany, and Jose Sanchez, Grand Island, N.Y., assignors to Pennwalt Corporation, Philadelphia, Pa.
No Drawing. Original application June 3, 1970, Ser. No. 43,208, now Patent No. 3,686,102. Divided and this application Feb. 18, 1972, Ser. No. 227,600
Int. Cl. C08f 3/56, 7/04
U.S. Cl. 260—89.1                4 Claims

ABSTRACT OF THE DISCLOSURE

Improvements in the polymerization of ethylenically unsaturated monomers, the curing of unsaturated polyester resin compositions, and the curing (preferably curing and foaming) of elastomer compositions are achieved by the use of certain β-substituted diperoxyketals of the formula

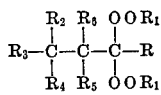

such as 2,2 - di(t - butylperoxy) - 4 - methylpentane and 4,4-di(t-butylperoxy)heptane.

---

This is a division of application Ser. No. 43,208, filed June 3, 1970 (now U.S. Pat. No. 3,686,102, issued Aug. 22, 1972).

BACKGROUND OF THE INVENTION (a) Field of Invention

This invention relates to improved processes for polymerizing ethylenically unsaturated monomers, curing unsaturated polyester resins, and curing elastomer compositions by employing as catalysts certain β-substituted diperoxyketals.

(b) Related Art

Diperoxyketals as a class of peroxides have about ten-hour half-lives at about 90°–120° C. With such characteristics, their use has been disclosed for curing of unsaturated polyester resins, for polymerizing ethylene and other vinyl monomers, and for crosslinking (or curing) of natural and synthetic rubbers and ethylene homo- and copolymers. They have also found uses as additives in diesel fuel and as free-radical generators in the synthesis of organic compounds.

Since diperoxyketals are normally prepared from low-cost ketones and low-cost hydroperoxides (usually t-butyl hydroperoxide—"t" indicating tertiary), they are potentially low-cost sources of free-radicals. Currently marketed are three such derived diperoxyketals, i.e., 2,2-di(t-butylperoxy)butane; 1,1 - di(t - butylperoxy) - 3,3,5-trimethylcyclohexane; and n-butyl 4,4 - di(t - butylperoxy) valerate. The third of these has a much longer half-life and is thus of more limited use in curing of unsaturated polyester resins and in initiating vinyl polymerizations.

Dickey (U.S. Pat. No. 2,455,569) is the initial patent disclosing a wide range of diperoxyketals and diperoxyacetals. While not giving examples, Dickey disclosed that, on the basis of the properties possessed by these peroxidic compounds, they may be useful as diesel fuel additives, polymerization initiators, curing agents for polyester resins, etc. However, no attempt is made in the patent to differentiate among which of the compounds might be more useful for a given application, etc.

Several patents have subsequently issued disclosing that specific types of diperoxyketals are more useful in certain applications. For example, U.S. Pat. No. 2,650,913 discloses the use of 2,2-di(t-butylperoxy)butane at a catalyst for ethylene polymerization; U.S. Patents 2,656,-334 and 2,692,260 disclose vinyl polymerizations employing catalyst combinations such as dibenzoyl peroxide and 2,2 - di(t - butylperoxy)butane; Netherlands application 6,403,775 (Jan. 25, 1965) discloses high pressure ethylene polymerization using various di(t-butylperoxy) ketals derived from cyclohexanone and substituted cyclohexanones; U.S. Pat. No. 2,698,311 discloses the curing of unsaturated polyester resins such as diallyl phthalate/polyethylene glycolfumarate using 2,2-di(t-butylperoxy)butane as a curing agent (or catalyst); German Pat. No. 945,187 discloses the use of 2,2 - di(t - butylperoxy)butane and 1,1 - di(t-butylperoxy) - 3,3,5 - trimethylcyclohexane as catalysts for a rubber vulcanizing process. Similar disclosures are also found in U.S. Pats. 3,344,125 and 3,296,184.

BRIEF SUMMARY OF THE INVENTION

This invention concerns improved processes for:

(A) Polymerizing ethylenically unsaturated monomers which are responsive at suitable temperatures and pressures to initiating amounts of free radical generators as polymerization initiators;

(B) Curing unsaturated polyester resin compositions by heating in the presence of initiating amounts of free radical polymerization initiators; and (C) Preparing foamed, cured elastomers by heating a composition containing elastomer, blowing agent and free-radical generating curing agent in the absence or presence of fillers and additives, the improvement residing in the use, as said initiator or curing agent, a beta (β)-substituted diperoxyketal of the formula

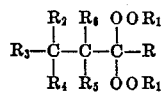

where

R is a lower alkyl radical or can be equivalent to

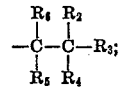

$R_1$ is a t-alkyl or t-cycloalkyl radical having 4–7 carbon atoms, a t-aralkyl radical having 9–20 carbon atoms, or both $R_1$'s taken together can form an alkylene diradical of 6–12 carbon atoms having a tert.-carbon atom at each end;

$R_2$ and $R_3$ are selected from H or lower alkyl, cycloalkyl, lower alkoxy, cycloalkoxy, phenoxy or substituted phenoxy, aralkoxy, acyloxy and aroyloxy radicals and can be the same or different except that only one of $R_2$ and $R_3$ can be H;

$R_4$ is selected from H, when R is other than methyl, or a lower alkyl, cycloalkyl, lower alkoxy, cycloalkoxy, phenoxy or substituted phenoxy, aralkoxy, acyloxy or aroyloxy radical; and $R_5$ and $R_6$ can be the same or different and are selected from H and lower alkyl.

For the above defined R groups, the lower alkyl and alkoxy radicals normally contain 1–4 carbons; the cycloalkyl and cycloalkoxy radicals, 3–7 carbons; the aralkoxy radical, 7–16 carbons; the acyloxy radical, 1–4 carbons; and the aroyloxy radical, 6–12 carbons.

DETAILED DESCRIPTION OF INVENTION

It has now been discovered that higher polymerization efficiencies, faster curing of unsaturated polyester resin compositions, and foamed, cured elastomers with superior density and ultimate tensile values are obtained when the above-defined β-substituted diperoxyketals are employed than when employing other diperoxyketals or other leading commercial peroxides such as dibenzoyl peroxide).

Diperoxyketals

The above defined β-substituted diperoxyketals can be prepared by methods well-known to the art and are normally derived from β-substituted acyclic ketones. The following list of diperoxyketals are typical examples of those defined by the formula

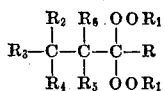

which are useful in the practice of this invention:

2,2-di(t-butylperoxy)-4-methylpentane,
2,2-di(t-butylperoxy)-3,4-dimethylpentane,
2,2-di(t-butylperoxy)-3,3,4-trimethylpentane,
2,2-di(t-butylperoxy)-4-cyclohexyl-4-methylpentane,
2,2-di(t-butylperoxy)-4-cyclohexyloxy-4-methylpentane,
2,2-di(t-amylperoxy)-4-methylpentane,
2,2-di(α-cumylperoxy)-4-methylpentane,
3,3-di(t-butylperoxy)-5-methylheptane,
3,3-di-t-amylperoxy)-5-methylheptane,
3,3-di(α-cumylperoxy)-5-methylheptane,
2,2-di(t-butylperoxy)-4-methoxy-4-methylpentane,
2,2-di(t-amylperoxy)-4-methoxy-4-methylpentane,
2,2-di(α-cumylperoxy)-4-methoxy-4-methylpentane,
4,4-di(t-butylperoxy)-2,6-dimethylheptane,
4,4-di(t-amylperoxy)-2,6-dimethylheptane,
4,4-di(α-cumylperoxy)-2,6-dimethylheptane,
2,2-di(t-butylperoxy)-4,4-dimethylpentane,
2,2-di(t-amylperoxy)-4,4-dimethylpentane,
2,2-di(α-cumylperoxy)-4,4-dimethylpentane,
3,3-di(t-butylperoxy)hexane,
3,3-di(t-amylperoxy)hexane,
3,3-di(α-cumylperoxy)hexane,
3,3-di(t-butylperoxy)heptane,
3,3-di(t-amylperoxy)heptane,
3,3-di(α-cumylperoxy)heptane,
4,4-di(t-butylperoxy)heptane,
4,4-di(t-amylperoxy)heptane,
4,4-di(α-cumylperoxy)heptane,
2,2-di(t-butylperoxy)-4-methyl-4-phenoxypentane,
2,2-di(t-amylperoxy)-4-methyl-4-phenoxypentane,
2,2-di(α-cumylperoxy)-4-methyl-4-phenoxypentane,
2,2-di(t-butylperoxy)-4-acetoxy-4-methylpentane,
2,2-di(t-amylperoxy)-4-acetoxy-4-methylpentane,
2,2-di(α-cumylperoxy)-4-acetoxy-4-methylpentane,
2,2-di(t-butylperoxy)-4-benzoyloxy-4-methylpentane,
2,2-di(t-amylperoxy)-4-benzoyloxy-4-methylpentane,
2,2-di(α-cumylperoxy)-4-benzoyloxy-4-methylpentane,
4,4-di(t-butylperoxy)-2,6-dimethoxy-2,6-dimethylheptane,
4,4-di(t-amylperoxy)-2,6-dimethoxy-2,6-dimethylheptane,
3-isobutyl-3,6,6,9,9-pentamethyl-1,2,4,5-tetraoxacyclononane,
3-neopentyl-3,6,6,9,9-pentamethyl-1,2,4,5-tetraoxacyclononane,
3,6,6,9,9-pentamethyl-3-(2'-methoxy-2'-methylpropyl)-1,2,4,5-tetraoxacyclononane,
3-(2'-methylbutyl)-3-ethyl-6-6,9,9-tetramethyl-1,2,4,5-tetraoxacyclononane,
3-butyl-3-ethyl-6,6,9,9-tetramethyl-1,2,4,5-tetraoxacyclononane,
6,6,9,9-tetramethyl-3,3,di-n-propyl-1,2,4,5-tetraoxacyclononane,
3,3-diisobutyl-6,6,9,9-tetramethyl-1,2,4,5-tetraoxacyclononane and
3-isobutyl-3,6,6,11,11-pentamethyl-1,2,4,5-tetraoxacycloundecane.

Preferred diperoxyketals include 2,2-di(t-butylperoxy)-4-methylpentane,
2,2-di(t-amylperoxy)-4-methylpentane,
2,2-di(t-butylperoxy)-4-methoxy-4-methylpentane,
3,3-di(t-butylperoxy)-5-methylheptane,
3,3-di(t-butylperoxy)heptane,
4,4-di(t-butylperoxy)-2,6-dimethylheptane and
4,4-di(t-butylperoxy)heptane.

Polymerization

In the free-radical initiated polymerization or copolymerization of ethylenically unsaturated monomers at suitable temperatures (and pressures), the subject diperoxyketals are found to provide improved efficiencies on a kinetic basis (efficiency of initiator to generate radicals useful for initiating polymerizations) as well as on weight and equivalent bases.

Ethylenically unsaturated monomers include olefins such as ethylene, propylene, styrene, vinyl toluene, vinyl pyridine divinyl benzene, alpha-methylstyrene, 1,3-butadiene, isoprene and chloroprene: vinyl esters such as vinyl acetate, vinyl propionate, vinyl laurate, vinyl benzoate and divinyl carbonate: unsaturated nitriles such as acrylonitrile and methacrylonitrile: acrylic acid and methacrylic acid and their esters and amides such as methyl, ethyl, n-butyl and 2-ethylhexyl acrylates and methacrylates and acrylamide and methacrylamide; maleic anhydride; maleic acid and fumaric acid and their esters; vinyl halo and vinylidene dihalo compounds such as vinyl chloride, vinyl fluoride, vinyl bromide, vinylidene chloride and vinylidene fluoride; perhalo olefins such as tetrafluoroethylene, hexafluoropropylene and chlorotrifluoroethylene; vinyl ethers such as methyl vinyl ether and n-butyl vinyl ether; acrolein; and mixtures thereof. Preferred (co) polymerizable monomers includes styrene and vinyl acetate.

Temperatures of about 20°–300° C. and diperoxyketal levels of about 0.01% to 5% or more by weight, based on the monomer, are normally employed in the polymerizations. Conventional solvents may optionally be added (e.g., benzene) to the reaction system.

While most vinyl polymerizations are performed at atmospheric pressure, there appears to be a need in the polyethylene industry for an initiator to be used at pressures up to 4000 atmospheres and in the 150–300° C. temperature range for the preparation of low density polyethylene. Dialkyl peroxides and t-butyl peroxybenzoate decompose to initiator radicals too slowly whereas diacyl peroxides decompose too rapidly to initiator radicals to be of use. On the other hand diperoxyketals decompose at about the proper rate to be useful in this respect. Use of 2,2-di(t-butylperoxy)butane (normally a liquid) in high pressure ethylene polymerizations is not ideal since at the high pressures employed it solidifies either in the pure form or in an ethylene or a hydrocarbon solution and cannot be pumped and metered into the polymerization reactors at certain desired concentrations. Its solubility at high pressures is improved somewhat by use of more polar solvents such as methanol. However, traces of these solvents get trapped in the polymer thus limiting the utility of the resulting polyethylene resin. Hence there is a need for an efficient diperoxyketal which will remain as a liquid at the pressures employed in ethylene polymerizations, either in the pure form or as a solution in ethylene or in a hydrocarbon solvent. A test that stimulates the effect of high pressures on the solidification of pure peroxides or solutions of the peroxides is described as follows: The diperoxyketal is dissolved in a hydrocarbon solvent to give a 50% solution by weight. The solution is then cooled to −30° C. and the state of matter is noted. Then the solution is cooled to −78° C. and the state of matter is again noted. When these tests are applied to three diperoxyketals of this invention (2,2-di(t-butylperoxy)-4-methylpentane, 3,3-di(t-butylperoxy)heptane and 3,3-di(t-butylperoxy)-5-methylheptane) and some conventional diperoxyketals (2,2-di(t-butylperoxy)butane and 1,1-di(t-butylperoxy)cyclohexane), the diperoxyketals of this invention pass the tests whereas the others fail.

Curing of polyester resins

In curing unsaturated polyester resin compositions by heating at suitable curing temperatures in the presence of free radical polymerization initiators, the use of diperoxyketals of this invention are found to give faster cures (that is, are most active) than conventionally used diperoxyketals and peroxidic compounds.

Unsaturated polyesters which are used as the one component of the polyester resin compositions according to the present invention are, for instance, polyesters as they are obtained by esterifying preferably ethylenically unsaturated di- or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2',dihydroxy ethyl ether); triethylene glycol (ethylene glycol bis(2-hydroxy ethyl ether); propanediol-1,2; butanediol-1,3; 2,2-dimethyl propanediol-1,3; butene (2)-diol-1,4, glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, and others, or by aromatic dicarboxylic acids, such as phthalic acid, tetrahydrophthalic acid, and others and their anhydrides such as phthalic anhydride. The acids used as well as the alcohols employed may be subsititued by other substituents, preferably by halogen. Examples of suitable halogenated acids are, for instance, trtra-chloro phthalic acid; 1,4,5,6,7,7-hexachloro bicyclo (2, 2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, $\alpha$-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

Temperatures of about 20–200° C. and diperoxyketal levels of about 0.05% to 5% or more by weight of curable unsaturated polyester resin are normally employed.

Other important features of the invention diperoxyketals, compared to some conventional peroxides used in polyester curing, are that they are liquids which can be more readily mixed with the resins that available solid peroxides or special solid peroxide solutions and that they are thermally stable at ambient temperatures, thus not requiring refrigerated storage and shipment.

Curing of elastomers

The diperoxyketals of this invention are also useful for curing (crosslinking or vulcanization) or curing and foaming of elastomers such as ethylene-propylene copolymers and terpolymers, polyethylene, ethylene-vinyl acetate copolymers, silicon rubbers, styrene-butadiene rubbers and the like in the presence or absence of additives and fillers such as sulfur, carbon black, silica, clay, carbonates, antioxidants, heat and light stabilizers, dyes, accelerators, zinc oxide, oils, etc.

An especially useful application for the invention diperoxyketals is as a curing agent in the preparation of foamed, cured elastomer compositions (particularly ethylene-propylene co- and ter-polymers) by heating at suitable temperatures an intimately dispersed mixture of elastomer, blowing agent, free radical generating curing agent and, optionally, additives and/or fillers. The temperature range is usually about 240°–450° F., preferably 280°–375° F. The diperoxyketal level is normally about 0.1–10.0 phr. (parts per hundred of resin), preferably 0.1–5. The blowing agent is usually used in an amount of about 0.5–10 phr. and the amount of filler may vary from about 0 to 120 phr.

Any of the well-known chemical blowing agents can be used in the preparation of the foamed articles in accordance with this invention as, for example, azobisformamide, diazoaminobenzene, N,N'-dinitrosopentamethylene tetramine, N,N'-dimethyl-N,N'-dinitrosoterephthalamide, p,p'-oxy - bis(benzene sulfonyl semicarbazide), azobis(isobutyronitrile), p,p'-oxy-bis-(benzene sulfonyl hydrazide), p, p'-diphenyl-bis(sulfonyl hydrazide), benzene sulfonyl hydrazide and m-benzene-bis-(sulfonyl hydrazide). Any of the well-known solvent blowing agents may also be used in this invention, as, for example, methyl chloride, methylene chloride, monochlorotrifluoromethane, monochlorodifluoromethane, 1,2 - dichlorotetrafluoroethane, 1,1,2-trichloroethane, chloroform, carbon tetrachloride, and low boiling hydrocarbons such as butane, pentane and hexane. Accordingly, any compound which decomposes or volatilizes to yield at least one mole of gas per mole of blowing agent at a temperature of 190° C. or less may be used. When preparing foamed elastomers it is essential that the foaming occurs at the proper viscosity of the elastomer just prior to the curing. Once the elastomer is cured, it becomes crosslinked and cannot be foamed. Thus, if the curing agent decomposes too fast, the elastomer cannot be formed.

Also, if the curing agent decomposes too slow, or if higher temperatures are required, then the gases released from the blowing agent escape from the elastomer due to a time factor or to the lower than ideal viscosity at the higher temperatures used. The curing agent also should not be too volatile where it can be lost due to evaporation before the curing temperature is reached.

The diperoxyketals of this invention are ideally suited as curing agents when certain elastomers such as the ethylene propylene copolymers and ter-polymers are foamed. This is illustrated in Examples V and VI.

Conventional diperoxyketals have certain drawbacks in this application. N-Butyl 4,4-di(t-butylperoxy)valerate decomposes at too high of a temperature; the cyclic perketals such as 1,1 - di(t-butylperoxy)cyclohexane and 1, 1 - di(t-butylperoxy) - 3,3,5 - trimethylcyclohexane decompose at too low temperatures; and 2,2-di(t-butylperoxy)butane is somewhat too volatile.

In mold curing and foaming, the diperoxyketals of this invention have other advantages over the higher temperature prior art curing agents such as n-butyl 4,4-di(t-butylperoxy)valerate. Because of the lower curing temperatures that can be used with our products, i.e. below 320° F., the molds can be opened immediately after the curing is finished. When n-butyl 4,4-di(t-butylperoxy) valerate is used, the mold has to be cooled down before the mold is opened. This is undesirable in production due to the extra time and cooling involved which is costly. It is also essential in mold curing that the curing agent does not decompose and cure the resin prior to the decomposition of the blowing agent. Thus, the low temperature curing agents as discussed above are also undesirable in this application as well as in the atmospheric foaming and curing applications.

EXAMPLES

The following examples illustrate the subject invention and are not in limitation thereof.

The first two examples illustrate the curing of unsaturated polyester resins. Given below are the description of the polyester resin composition and curing procedure used in Examples I and II:

Basic Unsaturated Polyester Resin.—The composition of the unsaturated polyester resin had the following composition:

Component:
- Maleic anhydride _____ moles__ 1.0
- Phthalic anhydride _____ do____ 1.0
- Propylene glycol _____ do____ 2.2
- Acid No. alkyd resin _____ 45-50
- Inhibitor added (Hydroquinone) __percent__ 0.013

Seven (7) parts by weight of the above alkyd resin was diluted with three (3) parts by weight of monomeric styrene. The resulting unsaturated polyester resin had the following physical properties:

(a) Viscosity (Brookfield No. 2 at 20 r.p.m.) _____ poises__ 13.08
(b) Specific Gravity _____ 1.14

Curing procedure.—Gelation and cure characteristics of various initiators at various temperatures in the basic unsaturated polyester resin were determined using the Standard SPI Exotherm procedure ("S.P.I. Procedure for Running Exotherm Curves—Polyester Resins" published in the Preprint of the 16th Annual Conference—Reinforced Plastics Division Society of the Plastics Industry, Inc., February 1961) and a Gel Time Meter.

Example I.—SPI Exotherm Data on Diperoxyketals, Dibenzoyl Peroxide and t-Butyl Peroxybenzoate at 100° C. (212° F.)

Using the Standard SPI Exotherm procedure at 100° C. (212° F.), various diperoxyketals were employed as curing catalysts at equal "active oxygen" levels and equal weight levels compared to 1% by weight of unsaturated polyester resin of dibenzoyl peroxide (a well known industry standard in polyester curing). A second standard at an equal "active oxygen" level was t-butyl peroxybenzoate. These data are summarized in Table I. Using cure times as a criterion for activity, the data show that in general the diperoxyketals of this invention (Nos. 1 through 7) have significantly greater activity than conventional diperoxyketals (Nos. 8 through 12) and t-butyl peroxybenzoate (No. 13) at equal weight as well as at equal "active oxygen" levels. In addition, at equal "active oxygen" levels several of the diperoxyketals of this invention (Nos. 2, 3, 4 and 6) are faster than dibenzoyl peroxide (No. 14) and at 1% weight levels almost all of the diperoxyketals of this invention (Nos. 1, 2, 3, 4, 6 and 7) are faster than dibenzoyl peroxide (No. 14).

TABLE I
100° C. (212° F.) SPI exotherms

| Number | Peroxide | Active oxygen level equal to 1% dibenzoyl peroxide | | | | 1% peroxide level | | | |
|---|---|---|---|---|---|---|---|---|---|
| | | Gel, min. | Cure, min. | Peak exotherm, °F. | Barcol hardness | Gel, min. | Cure, min. | Peak exotherm, °F. | Barcol hardness |
| 1 | 2,2-di-(t-butylperoxy)-4-methylpentane | 2.2 | 3.3 | 430 | 40-45 | 1.3 | 2.1 | 432 | 40-45 |
| 2 | 2,2-di-(t-butylperoxy)-4-methoxy-4-methylpentane | 1.0 | 1.7 | 422 | 40 | 0.6 | 1.2 | 420 | 45 |
| 3 | 3,3-di-(t-butylperoxy)-5-methylheptane | 1.5 | 2.3 | 427 | 40 | 1.1 | 1.8 | 426 | 35 |
| 4 | 2,2-di-(t-butylperoxy)-4,4-dimethylpentane | 0.5 | 1.1 | 410 | 40 | 0.3 | 1.1 | 390 | 45 |
| 5 | 3,3-di-(t-butylperoxy)-heptane | 3.0 | 4.1 | 426 | 35 | 2.2 | 3.2 | 430 | 40 |
| 6 | 4,4-di-(t-butylperoxy)-2,6-dimethylheptane | 1.8 | 2.7 | 426 | 40 | 1.5 | 2.4 | 425 | 35-40 |
| 7 | 2,2-di-(t-amylperoxy)-4-methylpentane | 2.3 | 3.3 | 424 | 45 | 2.0 | 3.0 | 426 | 45 |
| 8 | 2,2-di-(t-butylperoxy)-5-methylhexane | 3.5 | 4.9 | 424 | 40 | 2.6 | 3.6 | 432 | 35 |
| 9 | 2,2-di-(t-butylperoxy)-pentane | 3.9 | 5.4 | 421 | 30-35 | 2.6 | 3.8 | 432 | 30 |
| 10 | 2,2-di-(t-butylperoxy)-butane | 4.7 | 6.5 | 416 | 40 | 3.7 | 4.9 | 433 | 40-45 |
| 11 | 1,1-di-(t-butylperoxy)-3,3,5-trimethylcyclohexane | 3.0 | 4.1 | 419 | 40 | 2.8 | 3.8 | 432 | 45 |
| 12 | 1,1-di-(t-butylperoxy)-cyclohexane | 5.3 | 7.1 | 416 | 35-40 | 4.4 | 5.7 | 429 | 35-40 |
| 13 | t-Butylperoxybenzoate | 11.8 | 14.3 | 414 | 35-40 | | | | |
| 14 | Dibenzoyl peroxide | 2.0 | 3.1 | 424 | 45 | 2.0 | 3.1 | 424 | 45 |

Example II.—SPI Exotherm Data on Diperoxyketals and Dibenzoyl Peroxide at 82° C. (180° F.)

As in Example I, various diperoxyketals were compared to 1% dibenzoyl peroxide (No. 12) in the basic unsaturated polyester resin at equal "active oxygen" and 1% weight levels employing the Standard SPI Exotherm procedure at 82° C. (180° F.). These data are summarized in Table II. Again, the diperoxyketals of this invention (Nos. 1 through 7) are faster than conventional diperoxyketals (Nos. 8 through 11). At an equal "active oxygen" basis several of the diperoxyketals of this invention (Nos. 2, 3, 4 and 6) are faster than dibenzoyl peroxide and at 1% weight levels almost all of the diperoxyketals of this invention (Nos. 1, 2, 3, 4, and 6) are faster than dibenzoyl peroxide.

The results from Examples I and II demonstrate that the diperoxyketals of this invention are significantly superior to conventional diperoxyketals in curing unsaturated polyester resins. In addition, the diperoxyketals of this invention have activities in unsaturated polyester resins similar to and in some cases higher than dibenzoyl peroxide, a long time standard in the industry.

TABLE II
82° C. (180° F.) SPI exotherms

| Number | Peroxide | Active oxygen level equal to 1% dibenzoyl peroxide | | | | 1% peroxide level | | | |
|---|---|---|---|---|---|---|---|---|---|
| | | Gel, min. | Cure, min. | Peak exotherm, °F. | Barcol hardness | Gel, min. | Cure, min. | Peak exotherm, °F. | Barcol hardness |
| 1 | 2,2-di-(t-butylperoxy)-4-methylpentane | 4.1 | 6.2 | 385 | 25-30 | 2.7 | 4.2 | 400 | 40 |
| 2 | 2,2-di-(t-butylperoxy)-4-methoxy-4-methylpentane | 1.4 | 2.5 | 380 | 40 | 0.7 | 1.9 | 378 | 30 |
| 3 | 3,3-di-(t-butylperoxy)-5-methylheptane | 2.5 | 3.9 | 394 | 30 | 1.7 | 2.7 | 397 | 35-40 |
| 4 | 2,2-di-(t-butylperoxy)-4,4-dimethylpentane | 1.2 | 2.2 | 392 | 40 | 0.9 | 1.5 | 403 | 45 |
| 5 | 3,3-di-(t-butylperoxy)-heptane | 4.6 | 7.3 | 388 | 25 | 3.4 | 5.2 | 401 | 35 |
| 6 | 4,4-di-(t-butylperoxy)-2,6-dimethylheptane | 2.7 | 4.3 | 396 | 30-35 | 2.1 | 3.3 | 404 | 35-40 |
| 7 | 2,2-di-(t-amylperoxy)-4-methylpentane | 5.5 | 8.2 | 381 | 25 | 4.0 | 6.2 | 398 | 40 |
| 8 | 2,2-di-(t-butylperoxy)-5-methylhexane | 9.2 | 12.9 | 361 | 35 | 6.0 | 9.1 | 378 | 35 |
| 9 | 2,2-di-(t-butylperoxy)-pentane | 9.6 | 13.9 | 352 | 30 | 5.6 | 8.3 | 382 | 35 |
| 10 | 2,2-di-(t-butylperoxy)-butane | 12.8 | 17.1 | 352 | 35 | 7.7 | 10.9 | 378 | 40 |
| 11 | 1,1-di-(t-butylperoxy)-3,3,5-trimethylcyclohexane | 6.0 | 8.9 | 377 | 40 | 4.5 | 6.7 | 392 | 40 |
| 12 | Dibenzoyl peroxide | 3.2 | 4.7 | 394 | 45 | 3.2 | 4.7 | 394 | 40 |

Example III.—High Conversion Styrene Polymerization Efficiencies of Diperoxyketals Compared to those of t-Butyl Peroxybenzoate The efficiencies of several diperoxyketals as free-radical initiators for styrene bulk polymerizations at 100° C. compared to those of t-butyl peroxybenzoate, a well known and efficient art peroxide, were determined. The following procedure was employed:

A series of Pyrex tubes was filled with styrene solutions containing varying amounts of free radical initiator, several tubes being used for each initiator. The amounts of free-radical initiator in the tubes were adjusted so that the resulting conversion versus concentration plots would cross 98.5% conversion, ideally, after 8.5 hours at 100° C. 98.5% conversion was selected since styrene polymerizations are carried out almost to complete conversion commercially. Hence initiators that dead-end after 90% conversion and before 98.5% conversion or achieve 98.5% conversion after using very large quantities of initiator are not attractive commercially. After fusing out with $N_2$ gas the tubes were sealed and placed in a constant temperature bath thermostatted at 100° C. After 8.5 hours at 100° C. the tubes were removed and quickly chilled to −20° C. to prevent post polymerization. The sealed tubes were then broken and the polymer was taken up in 100 ml. of benzene. The resulting solution was poured into 1000 ml. of methanol to precipitate the poly(styrene) and the polymer was separated by filtration and was dried in an oven at 50–55° C. The conversion of styrene to polymer was then determined and plots of initiator concentration versus conversion were constructed. The initiator concentration required to attain 98.5% conversion (or thereabout) was compared, under similar conditions, to that of t-butyl peroxybenzoate. Equation (1) was used to determine efficiency data.

$$F_1/F_2 = Rp_1^2/Rp_2^2 \times Kd_2/Kd_1 \times [I]_2/[I]_1 \qquad (1)$$

$F_1/F_2$ is the efficiency of the initiator under investigation compared to that of t-butyl peroxybenzoate ($F_2$), $Rp_1$ and $Rp_2$ are rates of polymerization of initiator and t-butyl peroxybenzoate, respectively, $Kd_1$ and $Kd_2$ are decomposition rate constants for initiator and t-butyl peroxybenzoate, respectively, and $[I]_1$ and $[I]_2$ are concentrations of initiator and t-butyl peroxybenzoate, respectively, required for attainment of 98.5% conversion after 8.5 hours at 100° C. Under these conditions:

$$Rp_1^2/Rp_2^2 = 1$$

We also know $Kd_2/Kd_1$ from the half-lives of t-butyl peroxybenzoate and initiator, respectively. Hence we can calculate $F_1/F_2$ values for each diperoxyketal initiator. These data are shown in Table III. Also included in Table III are wt.$_1$/wt.$_2$ and eq.$_1$/eq.$_2$ values which represent ratios of weights and equivalents, respectively, of initiator to t-butyl peroxybenzoate at 98.5% conversion after 8.5 hours.

The ratio of $F_1/F_2$ represents the efficiency of utilization of radicals from the initiator in question for the polymerization of vinyl monomers (styrene) compared to that of t-butyl peroxybenzoate. If the radicals from the initiator were utilized as effectively as those of t-butyl peroxybenzoate $F_1/F_2$ would equal 1.0. Although the $F_1/F_2$ values of the diperoxyketals of this invention (Nos. 1 and 2) are somewhat less than 1.0 they are significantly higher than those of the art diperoxyketals (Nos. 4, 5, 6 and 7) and that of a diperoxyketal (No. 3) from a dissimilarly substituted ketone. Other diperoxyketals of this invention, such as Nos. 8 and 9, have $F_1/F_2$ values greater than 1.0. In the cases of wt.$_1$/wt.$_2$ and eq.$_1$/eq.$_2$ values the lower these ratios are than 1.0 the more efficient and attractive the initiator. When these values are less than 1.0 the initiator is more efficient on a weight and/or equivalent basis than t-butyl peroxybenzoate. The diperoxyketals of this invention (Nos. 1, 2, 8 and 9) have lower values of wt.$_1$/wt.$_2$ and eq.$_1$/eq.$_2$ than a diperoxyketal from a gamma substituted ketone (No. 3) and the art diperoxyketals (Nos. 4, 5, 6 and 7) [even though 1,1-di-(t-butylperoxy) - 3,3,5 - trimethylcyclohexane (No. 5) and 1,1-di-(t-butylperoxy)cyclohexane (No. 6) have significantly lower half-lives than the diperoxyketals of this invention (lower half-lives of initiators decrease wt.$_1$/wt.$_2$ and eq.$_1$/eq.$_2$ values)]. The diperoxyketals of this invention (Nos. 1, 2, 8 and 9) are very much more efficient than t-butyl peroxybenzoate at 100° C. for 8.5 hours in styrene on weight and equivalent bases.

Hence, in the polymerization of vinyl monomers such as styrene, the diperoxyketals of this invention are more efficient than the art diperoxyketals and diperoxyketals from unsubstituted acyclic ketones, dissimilarly substituted acyclic ketones and substituted and unsubstituted cyclic ketones.

TABLE III

100° C. styrene polymerization efficiencies of diperoxyketals compared to t-butyl peroxybenzoate

| Number | Peroxide | 100° C. benzene half-life, hrs. | Conversion, percent | Styrene efficiency | | |
|---|---|---|---|---|---|---|
| | | | | $F_1/F_2$ | Wt.$_1$/wt.$_2$ | Eq.$_1$/eq.$_2$ |
| 1 | 2,2-di-(t-butylperoxy)-4-methylpentane | 10.6 | 98.5 | 0.71 | 0.56 | 0.83 |
| 2 | 3,3-di-(t-butylperoxy)-heptane | 9.7 | 98.5 | 0.91 | 0.42 | 0.59 |
| 3 | 2,2-di-(t-butylperoxy)-5-methylhexane | 21.5 | 98.5 | 0.57 | 1.48 | 2.08 |
| 4 | 2,2-di-(t-butylperoxy)-butane | 10.2 | *98.0 | 0.19 | 1.81 | 2.99 |
| 5 | 1,1-di(t-butylperoxy)-3,3,5-trimethylcyclohexane | 3.8 | 98.5 | 0.24 | 0.72 | 0.92 |
| 6 | 1,1-di-(t-butylperoxy)-cyclohexane | 4.4 | 98.5 | 0.22 | 0.74 | 1.11 |
| 7 | 3,3-di-(t-butylperoxy)-pentane | 13.0 | *98.0 | 0.56 | 0.82 | 1.28 |
| 8 | 4,4-di-(t-butylperoxy)-heptane | 10.0 | 98.5 | 1.01 | 0.39 | 0.55 |
| 9 | 2,2-di-(t-amylperoxy)-4-methylpentane | 11.5 | 98.5 | 1.41 | 0.50 | 0.67 |

*Maximum conversion that could be obtained with these initiators.

Example IV.—Polymerization of Vinyl Acetate

The polymerization was performed in a sealed tube, under nitrogen, containing 2.5 g. of vinyl acetate, 2.5 g. of benzene and the amount of peroxide shown below at 85° C. for 1½ hours. After this time, the tube was cooled and the amount of polymer formed determined by evaporating off the excess monomers and solvent. The results are shown in Table IV below:

TABLE IV

| Peroxide | Percent poly(vinyl acetate) with— | |
|---|---|---|
| | 0.119% [0] | 0.0595% [07] |
| 2,2-di-(t-butylperoxy)-4-methylpentane | 38.3 | 27.7 |
| 2,2-di-(t-butylperoxy)butane | 31.0 | 24.4 |

These data show that in polymerizing vinyl acetate, the 2,2-di-(t-butylperoxy)-4-methylpentane, a diperoxyketal of this invention, is superior to 2,2-di-(t-butylperoxy) butane, a well known commercial diperoxyketal. In Table III it is shown that although the half-lives of these two diperoxyketals are similar, the prior art compound is slightly faster. Thus, if both products were equally efficient, the prior art diperoxyketal should have given a higher percent conversion to poly(vinyl acetate) than the diperoxyketal of this invention. This was not the case as shown by the above data.

Example V.—Foaming and Curing of Elastomer

The following formulation was mixed and blended on a two roll rubber mill (parts are by weight):

| | Parts |
|---|---|
| Ethylene propylene terpolymer ("Nordel 1070") | 100.0 |
| Carbon black ("SRF")-(filler) | 80.0 |
| Zinc oxide (accelerator) | 5.0 |
| Age Rite Resin D—trimethyldihydroquinoline (antioxidant) | 1.0 |
| Sulfur | 0.33 |
| 2,2'-azobis(isobutyronitrile)(blowing agent) | 0–2.0 |
| 2,2-di-(t-butylperoxy)-4-methylpentane | 2.0 |

Samples 1″ x 1″ x 0.17″ were foamed and cured in an oven at 300° F. for 20 minutes or at 320° F. for 15 minutes. The results are shown in Table V below:

TABLE V

| Blowing agent, parts used | Density of elastomer, 300° F./20 minutes | Gram/cc., 320° F./15 minutes |
|---|---|---|
| 0.0 | 1.00 | 1.03 |
| 2.0 | 0.75 | 0.76 |

The cured samples containing the blowing agent had a fine cellular structure while those without the blowing agent did not.

Example VI.—Foaming and Curing

The following formulations were mixed and blended on a two roll rubber mill:

| | Parts |
|---|---|
| Ethylene-propylene terpolymer (Nordel 1070) | 100.0 |
| Carbon black (SRF) | 80.0 |
| Zinc Oxide | 5.0 |
| Age Rite Resin D | 1.0 |
| 2,2'-Azobis(isobutyronitrile) | 2.0 |
| Peroxide | 0–2.0 |

These formulations were placed in a 5″ x 5″ x 0.075″ mold at 320° F. The mold was closed under 12 tons of total pressure. After 15 minutes, the mold was opened hot and the samples cooled to room temperature and their densities and ultimate tensile strength determined. The results are given below in Table VI:

TABLE VI

| Peroxide | Ultimate tensile, p.s.i. | Density (g.)/cc. |
|---|---|---|
| None | 66.3 | 0.86 |
| 2,2-di-(t-butylperoxy)-4-methylpentane (A) | 1,998 | 1.07 |
| n-Butyl 4,4-di-(t-butylperoxy)-valerate (B) | 1,813 | 1.25 |
| 1,1-di-(t-butylperoxy)-3,3,5-trimethylcyclohexane (C) | 1,343 | 1.19 |

These results show that the diperoxyketal of this invention (A) is superior to the prior art diperoxyketals (B, C) in this foaming and curing application both in terms of density and ultimate tensile.

What is claimed is:

1. In a process for the polymerization of ethylenically unsaturated monomers, which monomers are responsive at suitable temperatures to initiating amounts of free radical generators as polymerization initiators, the improvement which comprises employing as free radical generator, in the range of about 0.01% to 5% by weight based on monomer weight, a peroxyketal of the formula

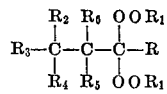

where:

R is selected from the group consisting of lower alkyl and

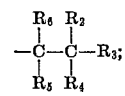

the $R_1$'s are selected from the group consisting of t-alkyl of 4–7 carbons, t-cycloalkyl of 4–7 carbons, t-(ar)alkyl of 9–20 carbons and, taken together with

—OO—C—OO—, participate in forming 1, 2, 4, 5-tetraoxacycloalkyl of 7–13 carbons wherein an oxygen atom of each peroxy group is attached to a tertiary carbon atom;

$R_2$ and $R_3$ are selected from the group consisting of H, lower alkyl, cycloalkyl, lower alkoxy, cycloalkoxy, phenoxy or substituted phenoxy, aralkoxy, acyloxy and aroyloxy, with the proviso that $R_2$ and $R_3$ can be the same or different except that only one can be H;

$R_4$ is selected from the group consisting of H, lower alkyl, cycloalkyl, lower alkoxy, cycloalkoxy, phenoxy or substituted phenoxy, aralkoxy, acyloxy and aroyloxy, with the proviso that $R_4$ is other than H when R is methyl; and $R_5$ and $R_6$ can be the same or different and are selected from the group consisting of H and lower alkyl.

2. The process of Claim 1 wherein said diperoxyketal is 2,2-di(t-butylperoxy)-4-methylpentane;
2,2-di(t-amylperoxy)-4-methylpentane;
3,3-di(t-butylperoxy)heptane; or
4,4-di(t-butylperoxy)heptane.

3. The process of Claim 2 wherein said monomer is styrene.

4. The process of Claim 2 wherein said monomer is vinyl acetate.

References Cited

UNITED STATES PATENTS

| | | | |
|---|---|---|---|
| 2,818,437 | 12/1957 | Wildi et al. | 260—Dig. 28 |
| 3,296,184 | 1/1967 | Portolani et al. | 260—88.2 S |
| 3,470,119 | 9/1969 | Benning et al. | 260—2.5 R |
| 3,686,102 | 8/1972 | Groepper et al. | 260—2.5 HA |

HARRY WONG, JR., Primary Examiner

U.S. Cl. X.R.

260—2.5 R, 2.5 H, 2.5 HA, 41 C, 67 UA, 77.5 UA, 78.4 R, 80 C, 88.3 R, 88.7 D, 89.5 A, 89.7 R, 91.1 M, 91.7, 92.1 R, 92.3, 92.8 R, 93.5 R, 94.2 R, 94.9 R, 861, Digest 28